United States Patent [19]

Janssens et al.

[11] 3,739,345

[45] June 12, 1973

[54] MULTIPLE EXECUTE INSTRUCTION APPARATUS

[75] Inventors: Juliaan Leo Gerard Janssens, Olmen; Mathieu Adrien Roger Peirsman, Antwerp, both of Belgium

[73] Assignee: International Standard Electric Corporation, New York, N.Y.

[22] Filed: May 25, 1971

[21] Appl. No.: 146,720

[30] Foreign Application Priority Data

May 27, 1970 Netherlands .......................... 7007615

[52] U.S. Cl. .............................................. 340/172.5

[51] Int. Cl. .............................................. G06f 9/20

[58] Field of Search .................................. 340/172.5

[56] References Cited

UNITED STATES PATENTS

| | | | |
|---|---|---|---|
| 2,874,901 | 2/1959 | Holmes | 340/172.5 |
| 3,153,225 | 10/1964 | Merner | 340/172.5 |
| 3,297,998 | 1/1967 | Klein | 340/172.5 |
| 3,348,211 | 10/1967 | Ghiron | 340/172.5 |
| 3,480,917 | 11/1969 | Day | 340/172.5 |
| 3,546,677 | 12/1970 | Barton | 340/172.5 |

OTHER PUBLICATIONS

Richards, "Electronic Digital Systems," 1966, pp. 187–190.

*Primary Examiner*—Paul J. Henon
*Assistant Examiner*—Sydney R. Chirlin
*Attorney*—C. Cornell Remsen, Jr. et al.

[57] ABSTRACT

This data processing system has a memory with multiple execute instruction words stored therein. Each of these words contains the number of instructions included in a sequence of instructions to be executed and the address of the first instruction of the sequence. This type instruction word has the advantages of speed and memory space economy with only a limited increase in additional hardware.

4 Claims, 3 Drawing Figures

MULTIPLE EXECUTE INSTRUCTION APPARATUS

The present invention relates to a data processing system including a memory with a plurality of instruction words, at least one type of which contains an address or part of an address of another instruction word to be processed.

Such a type of instruction word is for instance the jump to a subroutine instruction word. When such an instruction word is being processed the address of the next instruction word of a main programme and given by a programme counter is generally stored in the first location allocated to the subroutine in the memory of the system, the address of this memory location being equal to or derived from that stored in the jump to subroutine instruction word. At the same time, programme control is transferred to the second memory location of the subroutine. The last instruction of this subroutine is a jump back to the first memory location to enable return to the main programme at the address stored in this location after the subroutine has been carried out.

A jump to a subroutine instruction word enables a programmer to branch away from the normal flow of the programme as defined by the programme counter advancing by one unit as each instruction is completed, this in order to indicate the location of the next one. It also avoids the repetition of commonly used subsequences in a programme and it is easier in this way to introduce changes in the main programme and to enable different people to produce a large programme. Moreover, when only a single copy of the subroutine is made, the so-called closed subroutine, memory space economy is important, the more so if the subroutine is of appreciable length. If however the subroutine is very short the small amount of additional memory space or linkage needed to enter and leave the subroutine becomes comparable to the memory space needed for the subroutine itself and it is then sometimes more economical to insert a copy thereof wherever it is required in the memory of the main programme, i.e., the open subroutine. Thus, in general, whereas the closed subroutine may be advantageous over the open subroutine with respect to memory space needed, it may be disadvantageous with regard to processing time required due to the time needed to enter and leave the main programme.

Another type of instruction word is the execute instruction word which leads to a single instruction subroutine. There, instead of branching giving control to another sequence of instructions the normal sequence lends control and once this single instruction is carried out, the following one in the normal sequence is performed. Execute instructions have found various applications, e.g., when it is not desirable to change instructions stored in certain parts of the memory or for linkages between a main programme and ordinary subroutines. The advantage of the execute instruction is that it does not require additional memory space and that it may be executed during a small time interval, e.g., one basic cycle of the data processing system.

It is therefore an object of the present invention to provide a data processing system of the above type which processes a plurality of instructions faster than a closed subroutine and more economically than an open subroutine.

According to the present invention this is realized due to the fact that said one type of instruction word is adapted to control the execution of a number of instructions indicated by an instruction counter, the instruction having said address being the first of said number, and that the system includes means to decrement said instruction counter each time an instruction of said number is being executed.

This instruction word hereafter called multiple execute instruction word provides the above advantages of speed and memory space economy with only a limited increase of additional hardware. Just like the single execute instruction word it may be processed in one cycle of the data processing system.

In brief, the invention consists in a data processing system including a memory with multiple execute instruction words stored therein. Each of these words contains the number of instructions included in a sequence of instructions to be executed and the address of the first instruction of this sequence. When such a word is processed the number is registered in an instruction counter, the contents of the usual programme counter are stored in a temporary store and the execution of the first instruction located at the given address is started. During the execution of each such instruction the counter is decremented by 1 and during the execution of the last instruction the contents of the temporary store are transferred back to the programme counter.

The above mentioned and other objects and features of the invention will become more apparent and the invention itself will be best understood by referring to the following description of an embodiment taken in conjunction with the accompanying drawing wherein.

Figure 1:
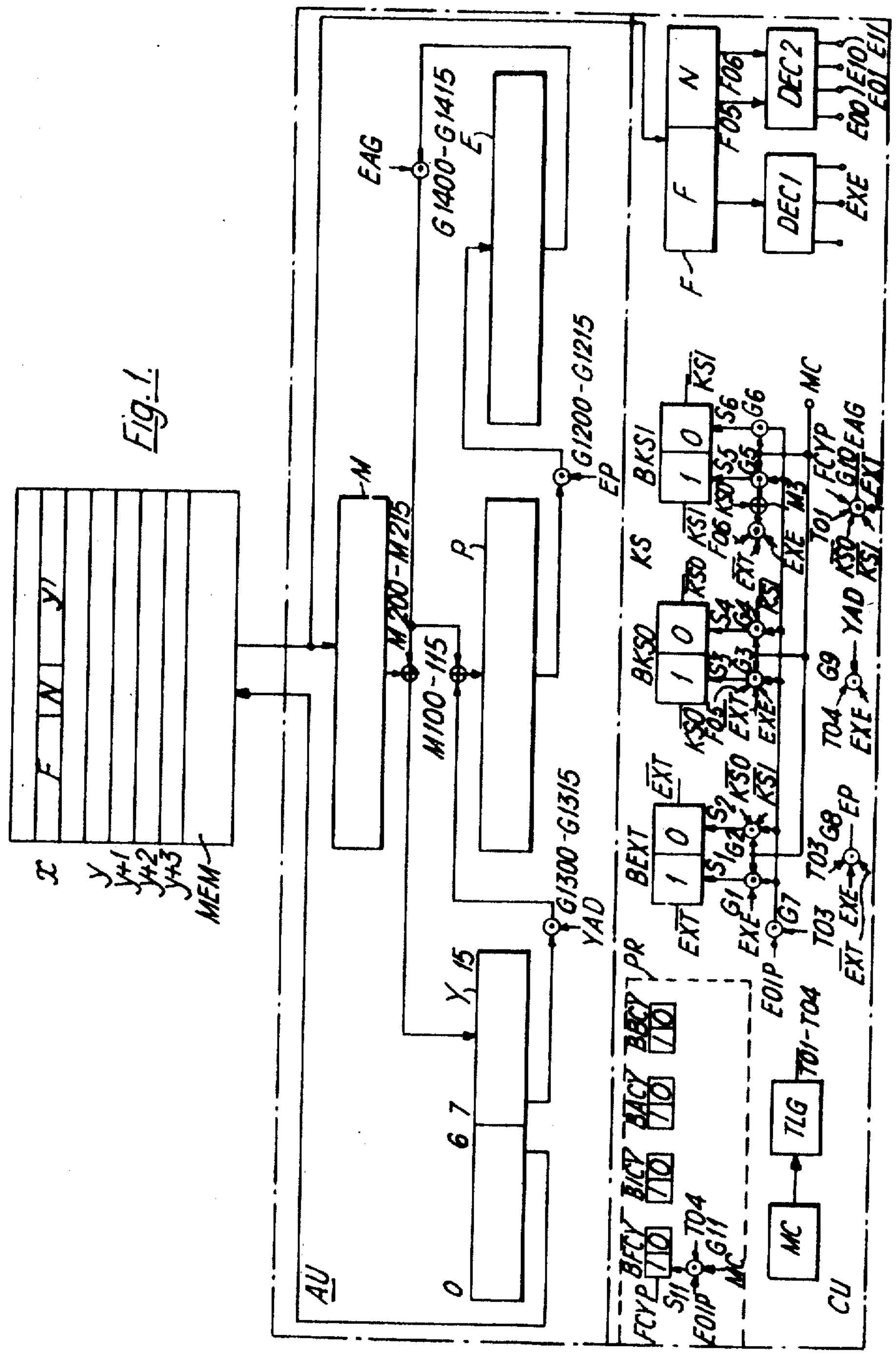
FIG. 1 is a block diagram of a data processing system according to the invention.

Principally referring to FIG. 1 the data processing system shown therein is constituted by a memory MEM, an arithmetic unit AU and a control unit CU.

The arithmetic unit AU includes a 16-bit buffer register M associated and coupled to the memory MEM, a 16-bit memory location register Y, a 16-bit programme counter P to store the address of an instruction being or to be executed, and a 16-bit register E to store the memory location of a multiple execute instruction EXE while the execution of a sequence of instructions started by this multiple execute instruction is being performed.

The control unit CU includes a 7-bit register F to store the operation code of an instruction, decoder circuits DEC1 and DEC2 connected to the register F and adapted to decode the operation code, a bistate device BEXT controlled by the AND-gates G1, G2 and G7, a four-position counter KS constituted by the bistate devices BKS0 and BKS1 controlled by the associated AND-gates G3 to G7, the AND-gates G8 to G10, the phase register PR including the bistate devices BFCY, BICY, BACY, BBCY and the AND-gate G11, the master clock MC and the timing circuit TLG. The bistate device BFCY is controlled by the gate G11 and the timing circuit TLG is controlled by the master clock MC.

The AND-gate G7 and the master clock MC control the AND-gates G1 to G6, the AND-gate G8 controls the AND-gates G1200–G1215 interconnecting the registers P and E, the AND-gate G9 controls the AND-gates G1300–G1315 which together with the mixers M100–M115 interconnect the register Y and the programme counter P, and the AND-gate G10 controls the AND-gates G1400–G1415 which together with the mixers M100–M115 and M200–M215 interconnect the register E, on the one hand, and the programme counter P and the register Y, on the other hand. The register Y also has access to the memory MEM and the register M has access to the register Y via the mixers M200–M215. Hereby it should be noted that only the connections between the registers, programme counter and memory which are necessary for understanding the invention have been shown.

Figure 2:
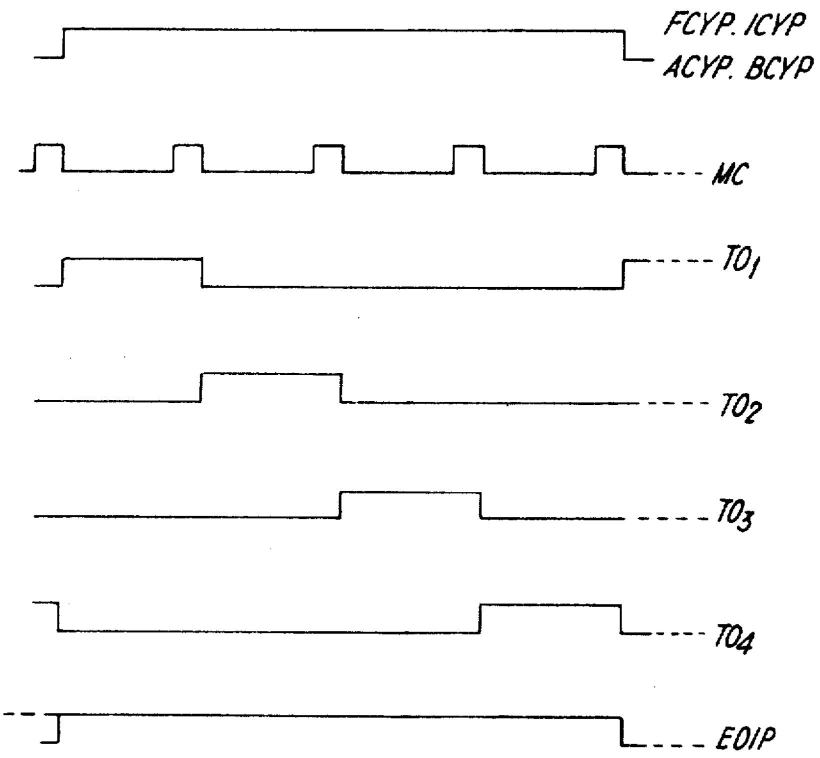
FIG. 2 shows pulses controlling this data processing system.

The data processing system is adapted to execute each of the instructions stored in the memory MEM in a minimum of one and in a maximum of four successive basic system cycles having each a duration of, for instance, 1 microsecond. During each of these basic cycles a corresponding one of the bistate devices BFCY, BICY, BACY and BBCY of the phase register PR is in its 1-condition, each bistate device associated to a cycle being set to its 1-condition at the end of the preceding cycle and being reset to its 0-condition at the start of the associated cycle. The pulse produced at the 1-output of a bistate device in its 1-condition is a 1 microsecond cycle pulse FCYP, ICYP, ACYP, BCYP as shown in FIG. 2. During each cycle pulse four successive timing pulses TO1 to TO4 are generated by the timing circuit TLG, each timing pulse having a duration of 250 nanoseconds. Each timing pulse starts at the end of a 50 nanoseconds MC pulse and finishes at the end of the immediately following MC pulse which is generated 200 nanoseconds after the immediately preceding one by the master clock MC.

During each last cycle of an instruction a so-called end-of-instruction pulse EOIP (FIG. 2, left dashed line) is generated in a not shown gating circuit and is used to start the first or fetch cycle of a following instruction. Indeed, the bistate device BFCY is set to its 1-condition by the signal S11 which may be represented by the Boolean AND-function S11 EOIP·TO4·MC appearing at the output of the AND-gate G11 at the end of the last cycle. The bistate device BFCY is reset to its 0-condition in a not shown manner at the start of a following cycle. The other bistate devices BICY, BACY, BBCY are of no concern for the present invention and are therefore not considered in detail.

The bistate devices BEXT, BKS0 and BKS1 have 1-outputs and 0-outputs which are indicated by EXT, KS0, KS1 and EXT, KS0, KS1 respectively. The 1-output of bistate device BFCY is indicated by FCYP. The AND-gate G7 is controlled by the pulses EOIP and TO3 so that a signal which may be represented by the Boolean AND-function EOIP·TO3 is generated at the output of this gate G7. The AND-gates G1 to G6 being controlled by the output signal of gate G7 and by the pulses indicated, the output signals S1 t S6 of these gates G1 to G6 may be represented by the following Boolean functions:

S1 EOIP·TO3·EXE·MC
S2 EOIP·TO3·KS0·KS1·MC
S3 EOIP·TO3·FO5·EXT·EXE·MC
S4 EOIP·TO3·KS1·MC
S5 EOIP·TO3·FO6·EXT·EXE·MC + EOIP·TO3·KS0·MC
S6 EOIP·TO3·MC

Likewise the output signals EP, YAD and EAG appearing at the outputs of the AND-gates G8 to G9 may be represented by the following Boolean AND-functions:

EP EXE·EXT·TO3
YAD EXE·TO4
EAG FCYP·EXT·KS0·DS1·TO1

With regard to the flow chart on the last page of the description it should be noted that the arrows shown therein mean: "stored or registered into." For instance P pointing to E means: "the contents of P are stored in E;" N pointing to KS means: "number N is stored in KS"; O pointing to M,F means: "zero is registered in M and F" i.e., M and F are reset.

Figure 3:
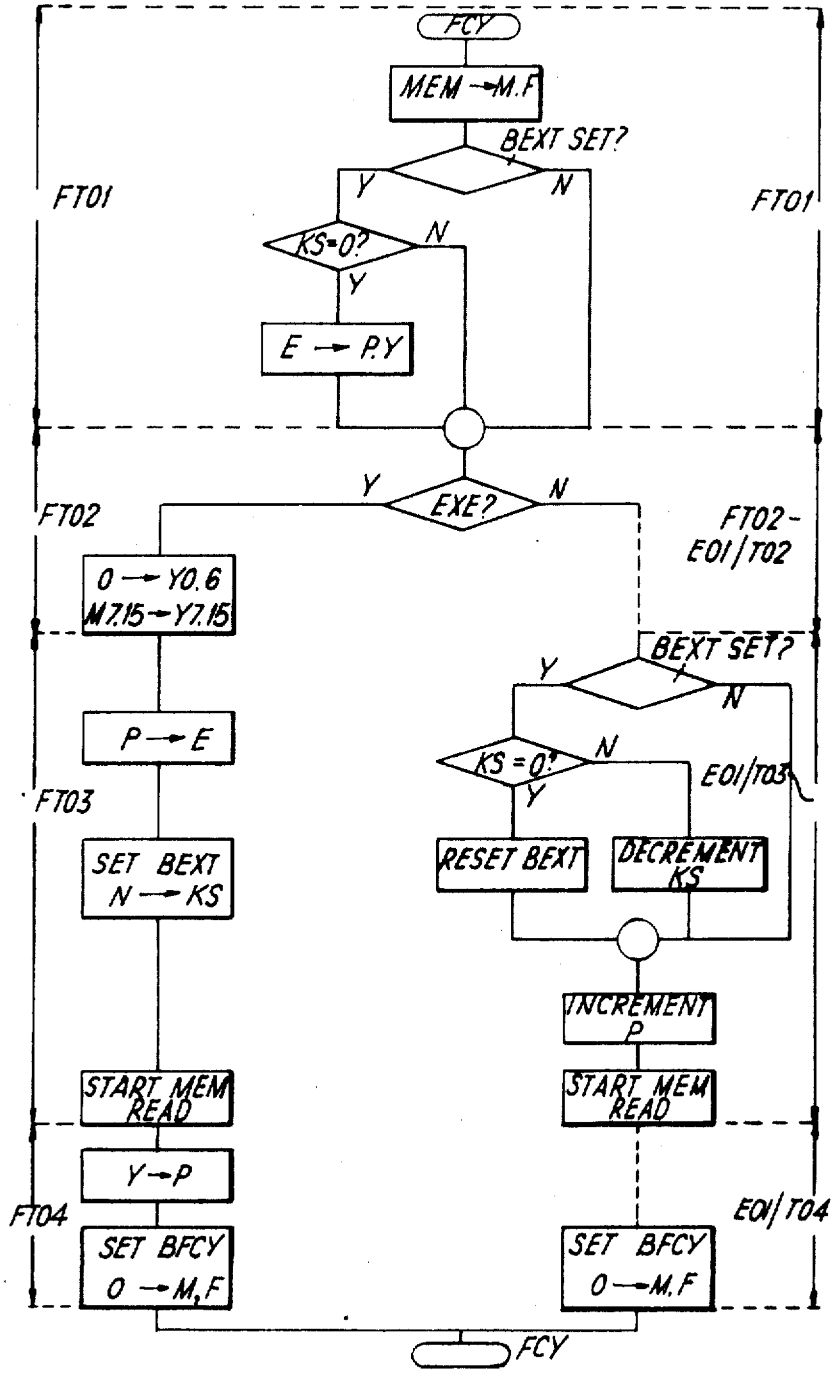
FIG. 3 is a flow chart illustrating how a multiple execute instruction is processed.

Referring to FIGS. 1, 2 and 3 the operation of the above data processing system is described in detail hereinafter in connection with the execution of a so-called multiple execute instruction EXE which is adapted to start the execution of a sequence of a plurality of instructions.

During the execution of the last cycle of the instruction immediately preceding the present one the reading of the memory MEM is started by means of an address $x$ which is stored in the register Y and in the programme counter P. At the moment this last cycle finishes, the registers M and F are both reset and the bistate device BFCY associated to a fetch cycle is set to its 1-condition by the above signal S11 appearing at the output of the AND-gate G11. Consequently a fetch cycle pulse FCYP appears at the 1-output of the bistate device BFCY and during this fetch cycle pulse, four successive timing pulses TO1 to TO4 are generated by the timing circuit TLG.

During the first timing pulse TO1 of the fetch cycle the 16-bit instruction which has been addressed in the memory MEM by means of the address $x$ stored in the register Y is received in the register M and the 7-bit operation code of this instruction is received in the register F included in the control unit CU. It is supposed that this instruction is constituted by the last mentioned 7-bit operation code and by a 9-bit address $y'$, the operation code being itself constituted by a 5-bit function code F and by a 2-bit number N. This 5-bit function code F and this number N are decoded in the decoder circuits DEC1 and DEC2 respectively. Hereby one of the 32 outputs of the decoder circuit DEC1 and one of the four outputs E00 to E11 of the decoder circuit DEC2 are activated. It is supposed that the indicated output EXE and the output E11 are both activated, thus indicating that the instruction read is a multiple execute instruction EXE and that a sequence of four instructions has to be executed, the address $y'$ being part of the address $y$ of the first instruction of this sequence. Hereby it should be noted that the execution of a multiple execute instruction only requires a fetch cycle so that this cycle is also the last cycle and that consequently an EOIP pulse (FIG. 2, full line) is generated. In fact the EOIP pulse generated at the end of the preceding instruction is hence continued. For reasons of simplicity, it is further supposed that the four instructions of the sequence of instructions to be executed are themselves not multiple execute instructions.

The above operations are shown in the flow chart of FIG. 3 wherein the time intervals corresponding to the timing pulses TO1 to TO4 of the fetch cycle are indicated by FTO1 to FTO4 respectively. Hereby it should be noted that although these time intervals have the same duration they have not been represented by same lengths.

Since the bistate device BEXT is in its 0-condition nothing further happens during the first fetch cycle time interval FTO1.

During the second timing pulse TO2 of the fetch cycle, i.e., during time interval FTO2, the 9-bit address part y' forming part of the multiple execute instruction EXE and which is stored in the locations 7 to 15 of the register M (M7–15 in FIG. 3) is stored in the locations 7 to 15 of the register Y (Y7–15 on FIG. 3). On FIG. 1 this operation is schematically indicated by the register M being connected to the register Y via the mixers M200–M215. Simultaneously the bits in the locations 0 to 7 of the register Y are for instance reset to 0 (not shown) to form the complete 16-bit address y of the first instruction to be executed. Obviously any other address part could be inscribed in the locations 0 to 7 of the register Y to complete the address part y' and to form the complete address y.

During the third timing pulse TO3 of the fetch cycle, i.e., during time interval FTO3, the address x of the multiple execute instruction stored in the programme counter P is transferred to the register E via the 16 gates G1200–G1215 controlled by the above signal EP EXE·EXT·TO3 appearing at the output of AND-gate G8.

Also the bistate device BEXT which is a so-called J-K flipflop is set to its 1-condition due to both its 1-input and its 0-input being simultaneously activated. This 1-input is activated by the above signal S1 EOIP·TO3·EXE·MC, and the 0-input is activated by the above signal S2 EOIP·TO3·KS0·KS1·MC. The bistate device BEXT in its set condition indicates that a multiple execute instruction is being processed.

Simultaneously with the bistate device BEXT being set to its 1-condition the bits of the number stored in the locations 5 and 6 of the register F are registered in the counter KS. These bits which are indicated by FO5 and FO6 are more particularly registered in the bistate devices BKS0 and BKS1 respectively. Since both these bits are 1 these bistate devices are both set to their 1-condition so that the counter KS is in its 11 condition at the end of this operation:

bistate device BSK0 is set to its 1-condition since both its 1-input and its 0-input are activated by the above signals S3 EOIP·TO3·FO5·EXT·EXE·MC and S4 EOIP·TO3·KS1·MC respectively.

bistate device BKS1 is set to its 1-condition since both its 1-input and its 0-Input are activated by the above signals S5 EOIP·TO3·FO6·EXT·EXE·MC (the second part of S5 being zero) and S6 EOIP·TO3·MC respectively.

Finally the reading of the memory MEM is started by means of the address y of the first instruction to be executed stored in the register Y.

During the fourth timing pulse TO4 of the fetch cycle, i.e., during time interval FTO4, the address y stored in the register Y is registered in the programme counter P via the AND-gates G1300–G1315 which are authorized by the above signal YAD EXE·TO4 appearing at the output of the AND-gate G9 and via the mixers M100–M115.

At the end of this fourth timing pulse the registers M and F are reset (not shown) and the bistate device BFCY is again set to its 1-condition, i.e., in fact it is maintained in its set condition, by the signal S11 EOIP·TO4·MC appearing at the output of AND-gate G11 so that a new fetch cycle is started.

The above operations are clearly represented on the flow chart (top and left part) and therefore no further explanation is considered to be necessary.

During the first timing pulse FTO1 of the fetch cycle started the first 16-bit instruction which has been addressed in the memory MEM by means of the address y stored in the register Y is received in the register M and the 7-bit operation code of this instruction is registered in the F register of the control unit CU and decoded in the decoder circuits DEC1 and DEC2 thereof. Since the counter KS is not in its 0-position nothing further happens during the first timing pulse, as indicated in the flow chart.

During the second timing pulse FTO2 of the fetch cycle and since it is assumed that the first instruction is not a multiple execute instruction, i.e., output EXE of decoder DEC1 is not activated, the fetch cycle is continued and followed by one or more other cycles during which this first instruction is executed. This is not described in detail since it is of no concern for the invention. However, at the end of the third timing pulse TO3 of the last cycle of this first instruction (indicated by EOIP/TO3 on the flow chart), i.e., when an EOIP pulse is generated, the counter KS is decremented by 1 and brought in its 10-condition since the bistate device BKS1 thereof is brought in its 0-condition by the signal S6 EOIP·TO3·MC appearing at the output of the AND-gate G6. Also at the start of the fourth timing pulse TO4 of the last cycle the programme counter P is incremented by 1 thus indicating the address y + 1 of the second instruction of the sequence to be executed. This address is used to start the reading of the memory after it has been transferred to the Y register.

In a classical and therefore not described way the second and third instructions of the sequence of four are executed, and at the end of the timing pulse TO3 of the last cycle of these instructions the counter KS is each time decremented and thus brought in its 01 and 00-condition respectively in the following manner:

counter KS is brought in the 01-condition due to bistate device BKS0 being brought in its 0-condition by the signal S4 EOIP·TO3·KS1·MC appearing at the output of gate G4 and due to bistate device BKS1 being brought in its 1-condition by the signals S5 EOIP·TO3·KS0·MC (the first part of S5 being zero) and S6 EOIP·TO3·MC appearing at the outputs of the gates G5 and G6 respectively;

counter KS is brought in the 00-condition due to bistate device BKS1 being brought in its 0-condition by the signal S6 EOIP·TO3·MC appearing at the output of gate G6.

The counter KS is hence again in its 00-condition before the last or fourth instruction of the sequence is executed.

Also at the start of the fourth timing pulses TO4 of the last cycles of the second and third instructions the programme counter P is incremented by one, thus indicating the address y + 2 and y + 3 of the third and fourth instruction respectively. These addresses are then used to start the reading of the memory after they have been transferred to the Y register.

During the first timing pulse TO1 of the fetch cycle of this last or fourth instruction the address x of the multiple execute instruction which has been temporarily stored in the register E is transferred back to the register Y and to the programme counter P, as indicated in the flow chart, since bistate device BEXT is in the 1-condition and counter KS is in the 0-condition. This operation is performed via the gates G1400–G1415 and the mixers M200–M215 and M100–M115 respectively, the gates G1400–G1515 being authorized by the signal EAG  KS0·KS1·FCYP·TO1·EXT appearing at the output of the AND-gate G10.

At the end of the first time interval of the fetch cycle of the last instruction to be executed the register Y and the counter P are hence in the same condition as at the end of the first time terminal of the fetch cycle of the multiple execute instruction.

During the last cycle of the last instruction the bistate device BEXT is reset to its 0-condition, as indicated in the flow chart, by the signal S2  EOIP·TO3·KS0·KS1 appearing at the output of AND-gate G2 and the programme counter P is incremented by 1 so that the main programme will automatically be resumed at the address $x + 1$ after this last cycle has been executed. Also the bistate device BFCY is set and the registers M and F are reset.

It is clear that when the instruction EXE indicates that only a single instruction must be executed, the contents of the programme counter P are stored in the register E during the fetch cycle of this instruction and then transferred back to the programme counter during the immediately following fetch cycle. Although this transfer is hence in fact of no use it is performed in order to be able to maintain the same programme for any value of N.

In the above described example the instruction EXE contains the number N of instructions to be executed. Instead thereof it would also be possible to include this number in another instruction which would then be used to set the instruction counter KS prior to executing the EXE instruction. Instead of including the number of instructions in the EXE instruction or in another instruction, it would also be possible to use an EXE instruction which automatically executes the number of instructions indicated by a counter which is in a fixed position and which is each time set in this position, for instance, by the last instruction of the sequence.

It has been assumed in the above that none of the sequence of instructions to be executed is an EXE instruction. This restriction has however only be introduced to simplify the description since one may imagine a data processing system wherein this is not the case.

While the principles of the invention have been described above in connection with specific apparatus, it is to be clearly understood that this description is made only by way of example and not as a limitation on the scope of the invention.

We claim:

1. A data processing system including a memory containing a plurality of instruction words at least one type of which contains an address or part of an address of another instruction word to be processed wherein said one type of instruction word (EXE) is adapted to control the execution of a number of instructions, said number (N) indicated by said one type of instruction word and said one type of instruction word (EXE) containing the address of the first instruction of said number (N) of instructions comprising:

an instruction counter (KS);

means (G3–G7) to set said instruction counter (KS) to a state corresponding to said number (N) when said at least one type of instruction word (EXE) indicating said number (N) is being processed, said means (G3–G7) decrementing said instruction counter each time an instruction is being executed;

a register (E);

a program counter (P) for storing the address of an instruction being executed;

means (G1200–G1215) for temporarily storing the contents of said program counter (P) in said register (E) when said one type of instruction (EXE) is being executed;

means (G1400–G1415) for transferring the contents of said register (E) back to said program counter (P) when the last instruction of said number (N) is being executed;

a bistable device (BEXT) to indicate that said one type of instruction (EXE) and said sequence of instructions are being executed; and means (G1, G2, G7) for setting said bistate device (BEXT) to the 1-condition during the execution of said one type of instruction (E).

2. A data processing system according to claim 1 wherein said decrementing means (G3–G7) decrement said instruction counter (KS) when said bistate device (BEXT) is in its 1-condition, said instruction counter (KS) is not in a zero position and the instruction of said sequence being executed is not a said one type of instruction (EXE).

3. A data processing system according to claim 2 wherein said bistate device (BEXT) is reset to its 0-condition when said bistate device (BEXT) is in its 1-condition, said instruction counter (KS) is in its 0-condition, and the instruction of said sequence being executed is not said one type of instruction (EXE).

4. A data processing system according to claim 3 wherein the contents of said register (E) are transferred back to said program counter (P) when said bistate device (BEXT) is in its 1-condition and said instruction counter (KS) is in its 0-condition.

* * * * *